United States Patent
Hogenesch et al.

(10) Patent No.: US 12,514,848 B2
(45) Date of Patent: Jan. 6, 2026

(54) METHODS AND COMPOSITIONS FOR TREATMENT OF SMITH KINGSMORE SYNDROME

(71) Applicant: CHILDREN'S HOSPITAL MEDICAL CENTER, Cincinnati, OH (US)

(72) Inventors: John Hogenesch, Cincinnati, OH (US); Carlos Prada, Cincinnati, OH (US)

(73) Assignee: Children's Hospital Medical Center, Cincinnati, OH (US)

( * ) Notice: Subject to any disclaimer, the term of this patent is extended or adjusted under 35 U.S.C. 154(b) by 981 days.

(21) Appl. No.: 17/614,943

(22) PCT Filed: May 29, 2020

(86) PCT No.: PCT/US2020/035145
§ 371 (c)(1),
(2) Date: Nov. 29, 2021

(87) PCT Pub. No.: WO2020/243446
PCT Pub. Date: Dec. 3, 2020

(65) Prior Publication Data
US 2022/0233511 A1    Jul. 28, 2022

Related U.S. Application Data

(60) Provisional application No. 62/927,953, filed on Oct. 30, 2019, provisional application No. 62/926,633, filed on Oct. 28, 2019, provisional application No. 62/908,690, filed on Oct. 1, 2019, provisional application No. 62/854,488, filed on May 30, 2019.

(51) Int. Cl.
| | |
|---|---|
| *A61K 31/43* | (2006.01) |
| *A61K 31/436* | (2006.01) |
| *A61P 25/00* | (2006.01) |

(52) U.S. Cl.
CPC ............ *A61K 31/436* (2013.01); *A61P 25/00* (2018.01)

(58) Field of Classification Search
CPC .................................................... A61K 31/436
See application file for complete search history.

(56) References Cited

U.S. PATENT DOCUMENTS

2018/0214452 A1    8/2018  Lee et al.

FOREIGN PATENT DOCUMENTS

WO    WO 2019/115640 A1    6/2019

OTHER PUBLICATIONS

Fischer et al., Health Effects of Long-Term Rapamycin Treatment: The Impact on Mouse Health of Enteric Rapamycin Treatment from Four Months of Age throughout Life. PLoS One. May 15, 2015;10(5):e0126644(1-18).
Gordo et al., mTOR mutations in Smith-Kingsmore syndrome: Four additional patients and a review. Clin Genet. Apr. 2018;93(4):762-775. Epub Feb. 13, 2018.

*Primary Examiner* — Shawquia Jackson
(74) *Attorney, Agent, or Firm* — Porter Wright Morris & Arthur LLP

(57) ABSTRACT

Methods for alleviating symptoms in a Smith Kingsmore Syndrome (SKS) patient using low doses of a mTOR inhibitor. Also provided herein are methods to determine suitable doses of a mTOR inhibitor for a SKS patient to alleviate at least one symptom associated with SKS with little or no negative impact on behavior features such as the sleep pattern of the SKS patient.

26 Claims, No Drawings

METHODS AND COMPOSITIONS FOR TREATMENT OF SMITH KINGSMORE SYNDROME

CROSS-REFERENCE TO RELATED APPLICATIONS

This application is a national stage filing under 35 U.S.C. 371 of International Patent Application Serial No. PCT/US2020/035145, filed on May 29, 2020, which claims the benefit of U.S. Provisional Applications 62/854,488, filed May 30, 2019; 62/908,690, filed Oct. 1, 2019; 62/926,633, filed Oct. 28, 2019; and 62/927,953 filed Oct. 30, 2019. The contents of each of the prior applications is hereby incorporated by reference in their entirety for all purposes.

GOVERNMENT SUPPORT

This invention was made with government support under NS054794 awarded by the National Institutes of Health. The government has certain rights in the invention.

BACKGROUND OF THE INVENTION mTORopathies are genetic disorders caused by gain-of-function mutations in the mammalian target of rapamycin (mTOR) gene. For example, heterozygous germline mutations in the mTOR gene underlie the mTORopathy Smith-Kingsmore syndrome (SKS), which is an infrequent entity with autosomal dominant inheritance. Also known as macrocephaly-intellectual disability-neurodevelopmental disorder-small thorax syndrome (MINDS), SKS symptoms can present in very early childhood, sometimes at birth and within the first six months of life. Common symptoms associated with SKS include intellectual disability, macrocephaly, epilepsy, autism, hypotonia, and facial dysmorphism.

Current treatment modalities for SKS and other mTORopathies are focused on improving the quality of life, including the treatment of medical concerns (e.g., seizures) and behavioral and psychological manifestations associated with the disease. There is a need to develop new therapeutic approaches for alleviating SKS symptoms.

SUMMARY OF THE INVENTION

The present disclosure is based, at least in part, on the unexpected discoveries that low doses of rapamycin (a mTOR inhibitor) successfully improved the primary behavioral symptoms of Smith Kingsmore Syndrome (SKS) without negative impact on the locomotor activities and sleep patterns of the patients. It was also discovered that behavior features such as sleep patterns and locomotor activities may be used as biomarkers for determining suitable doses (personalized doses) of mTOR inhibitors such as rapamycin in alleviating symptoms in individual SKS patients.

Accordingly, one aspect of the present disclosure provides a method for alleviating Smith Kingsmore Syndrome (SKS) in a subject, the method comprising administering to a subject in need thereof an effective amount of a mTOR inhibitor. The effective amount of the mTOR inhibitor is sufficient to alleviate at least one symptom associated with SKS and is substantially free of negative impact on sleep in the subject.

In some embodiments, the mTOR inhibitor is a rapamycin compound. In some examples, the rapamycin compound is rapamycin. An effective amount of rapamycin results in a blood level of rapamycin at about 1-3 ng/ml in the subject. In some instances, the subject can be administered about 0.5 mg to 2 mg of the rapamycin once every 1 to 3 days. In some examples, the subject can be administered a daily dose of rapamycin at about 0.5 mg to 2 mg.

In some embodiments, the method disclosed herein may further comprise monitoring impact on the sleeping pattern of the subject after administration of the mTOR inhibitor (e.g., a rapamycin compound such as rapamycin), and adjusting dose of the mTOR inhibitor based on changes in sleeping pattern before and after administration of the rapamycin compound. If administration of the mTOR inhibitor worsens a sleep problem in the subject, the dose of the mTOR inhibitor can be reduced. On the other hand, if administration of the mTOR inhibitor shows no negative impact on a sleep problem, the dose of the mTOR inhibitor can be increased. Exemplary sleep problems include, but are not limited to, advanced sleep phase syndrome (ASPS), delayed sleep phase syndrome (DSPS), or a combination thereof.

In some embodiments, the method disclosed herein may involve given the subject an initial dose of the rapamycin (e.g., about 0.5 mg per day) for a first course of treatment, followed by a maintenance dose of the rapamycin after the first course of treatment to maintain the blood level of the rapamycin compound at about 1-3 ng/ml (e.g., about 2 ng/ml) in the subject. The initial dose of the rapamycin is increased when the blood level of rapamycin is lower than 1 ng/ml in the subject after administration of the rapamycin.

In another aspect, the present disclosure provides a method for alleviating Smith Kingsmore Syndrome (SKS) in a subject with a mTOR inhibitor as a suitable low dose using one or more behavior features of the subject as a biomarker. Such a method may comprise: (i) administering to a subject in need thereof an initial dose of a mTOR inhibitor; (ii) monitoring one or more behavior features of the subject before and after administration of the rapamycin compound; and (iii) adjusting the dose of the mTOR inhibitor based on the result of (ii).

The one or more behavior features comprise locomotor activity, sleep pattern, hyperphagia, agitation, sensitivity to pain, seizure control, or a combination thereof. In some examples, the one or more behavior features comprise a sleep pattern, which comprises advanced sleep phase syndrome (ASPS), delayed sleep phase syndrome (DSPS), or a combination thereof. In that case, step (iii) can be performed by reducing the dose of the mTOR inhibitor when the initial dose of the mTOR inhibitor leads to negative impact on the sleep pattern. In other examples, the one or more behavior features comprise locomotor activity, which comprises stereotypic behavior. In that case, step (iii) can be performed by increasing the dose of the mTOR inhibitor when the initial dose of the mTOR inhibitor leads to reduced stereotypic behavior, or reducing the dose of the mTOR inhibitor when the initial dose of the mTOR inhibitor leads to increased stereotypic behavior.

In the methods disclosed herein, the mTOR inhibitor can be a rapamycin compound, for example, rapamycin. In some embodiments, the initial dose of rapamycin may range from about 0.5 mg to about 2 mg once a day to once every three days. In some examples, the initial dose of the rapamycin is a daily dose of about 0.5-2 mg.

Any of the mTOR inhibitors disclosed herein may be formulated in a pharmaceutical composition, which further comprises a pharmaceutically acceptable carrier. In some embodiments, the mTOR inhibitor can be administered to the subject by a parenteral route or orally. The subject to be treated by any of the methods disclosed herein may be a human patient having SKS. In some instances, the human patient is a human child.

Also within the scope of the present disclosure is a pharmaceutical composition comprising a low dose of a mTOR inhibitor (e.g., a rapamycin compound such as rapamycin) for use in treating SKS, as well as use of the low dose mTOR inhibitor for manufacturing a medicament for use in treating SKS.

The details of one or more embodiments of the invention are set forth in the description below. Other features or advantages of the present invention will be apparent from the following drawings and detailed description of several embodiments, and also from the appended claims.

DETAILED DESCRIPTION OF THE INVENTION

Smith Kingsmore syndrome (SKS) is a genetic disorder caused by mutations in the mTOR gene located at chromosome location 1p36. The MTOR gene is a key regulator of cell growth, cell proliferation, protein synthesis and synaptic plasticity. Genetic mutations in the mTOR gene involved in SKS cause the mTOR pathway to become hyperactive (i.e., gain of function). As a result of pathway hyperactivation, the affected neurons grow unusually large and misshapen, leading to brain malformations, cognitive delays and epilepsy.

The mTOR activity in the brain affects various behavior features, including sleep patterns. For example, if a subject has too much mTOR activity in the brain, tau is shortened (e.g., from 24 to 22 hours), causing the subject to get up earlier and wake up earlier. Conversely, if a subject has too little mTOR activity in the brain, tau is lengthened causing the subject to sleep later and stay up later.

The present disclosure aims at developing treatment of SKS with mTOR inhibitors at proper doses so that the mTOR inhibitors can suppress the hyperactive mTOR pathway in SKS patients to a balanced level, under which one or more symptoms associated with SKS can be alleviated and behavior features (e.g., sleep patterns) of the subject are not negatively affected.

The present disclosure reports that, unexpectedly, low dose of rapamycin (a mTOR inhibitor) successfully alleviated symptoms associated with SKS in SKS patients with insignificant impact on sleep patterns or other behavior features (e.g., locomotor activities) in the SKS patients. Further, the present disclosure reports that behavior features such as sleep patterns, locomotor activities, hyperphagia, agitation, sensitivity to pain, seizure control, or a combination thereof can be used as biomarkers for assessing proper dosage of a mTOR inhibitor for an individual SKS patient.

Accordingly, provided herein are methods for alleviating SKS symptoms using a mTOR inhibitor such as rapamycin at a dose lower than the dose of the mTOR inhibitor commonly used therapeutic applications to achieve the balance goal noted above. Also provided herein are methods for determining suitable doses (personalized doses) of a mTOR inhibitor for an individual SKS patient using one or more of the behavior features disclosed herein as a biomarker.

I. mTOR Inhibitors

The mammalian target of rapamycin (mTOR) protein, also known as FK506-binding protein 12-rapamycin-associated protein 1 (FRAP1), is a serine/threonine kinase encoded by the MTOR gene in humans. mTOR is the core component of two distinct protein complexes, mTORC1 and mTORC2, which regulate different cellular processes. mTOR inhibitors, as described herein, are molecules that inhibit (partially or completely) one or more biological activities of mTOR, thereby suppressing the mTOR signaling pathway. The mTOR inhibitors disclosed herein may be small molecule compounds (e.g., having a molecular weight no greater than 5,000 daltons or no greater than 1,000 daltons), antibodies, short interfering RNA (siRNA), short hairpin RNA (shRNA), antisense molecules, ribozymes, etc.

mTOR inhibitors disclosed herein may inhibit mTOR activities via various mechanisms. In some examples, a mTOR inhibitor (e.g., an interfering RNA or an antisense nucleic acid targeting mTOR) may inhibit synthesis of the mTOR protein (e.g., by inhibiting synthesis of, or causing destabilization of, an mRNA that encodes the polypeptide, or by inhibiting translation of the polypeptide). In some examples, a mTOR inhibitor may accelerate degradation of the mTOR protein. In other examples, a mTOR inhibitor may inhibit activation of mTOR (e.g., by inhibiting an activating modification such as phosphorylation or cleavage). Alternatively, a mTOR inhibitor may directly inhibit mTOR activity, for example, by blocking an active site of mTOR, causing a conformational change that lead to reduction of activity, causing dissociation of mTORC1 and/or mTORC2.

A mTOR inhibitor as disclosed herein may act directly by physical interaction with a mTOR protein. Alternatively, a mTOR inhibitor may act or indirectly, for example, by interacting with a second molecule whose activity contributes to activation of mTOR (e.g., a molecule that activates mTOR, e.g., by phosphorylating it), and/or by competing with mTOR for binding to a substrate, activator, or binding partner needed for activity of mTOR.

Exemplary mTOR inhibitors as described herein, include rapamycin and its derivatives (rapamycin compounds), ATP-competitive mTOR kinase compounds. In some examples, a mTOR inhibitor may be a bivalent inhibitor generated by combining a rapamycin compound with an ATP-competitive inhibitor of mTOR.

Rapamycin Compounds

Rapamycin compounds, as described herein, encompass rapamycin (a.k.a., sirolimus), pharmaceutically acceptable salts or esters thereof, analogues thereof (a.k.a., rapalogs), including prodrugs thereof. Rapamycin compounds can be macrolide compounds containing large (14-16-membered) lactone rings and reduced saccharide substituents. For example, a rapamycin compound disclosed herein may comprise a core structure of Formula I:

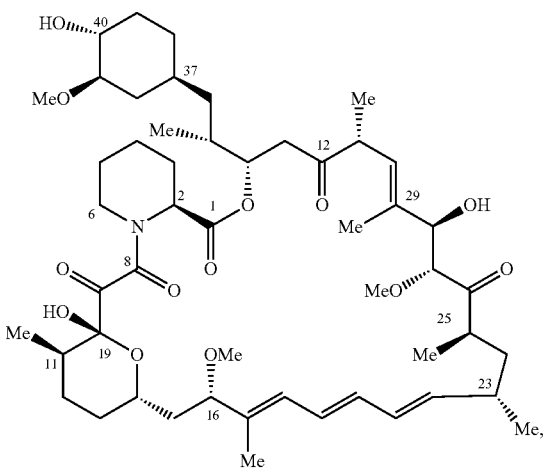

(Formula I)

which may optionally be substituted at one or more suitable positions as known to those skilled in the art. Non-limiting examples include positions C16, C32, and/or C40. Suitable substituents include, but are not limited to, $C_{1-3}$ alkyl, halogen, —CN, —$NO_2$, —$N_3$, $C_{2-4}$ alkenyl, $C_{2-4}$ alkynyl, —OR, —$NH_2$, or —SR, R being hydrogen, halogen, —CN, —$NO_2$, —$N_3$, acyl, $C_{1-3}$ alkyl, $C_{2-4}$ alkenyl, $C_{2-4}$ alkynyl; and a being 0, 1, 2, 3, 4, or 5.

In some examples, a rapamycin compound disclosed herein may comprise the core structure of Formula I and carry one or more additional functional groups. Non-limiting examples of functional groups include methoxy groups, hydroxyl groups, keto groups, benzene rings, pipecolate rings, cyclohexane rings, amine groups, alcohols, ethers, alkyl halides, thiols, aldehydes, ketones, esters, carboxylic acids, or amides.

The rapamycin compounds disclosed herein may be a natural product produced by bacteria. Alternatively, it may be a synthetic compound, which may be a modified version of a naturally-occurring compound.

Exemplary rapamycin compounds include, but are not limited to, sirolimus, everolimus, temsirolimus, ridaforolimus, N-dimethylglycinate-rapamycin, 32-deoxo-rapamycin, zotarolimus, acrolimus, and pimecrolimus. Additional examples include CCI-779, AP23573, and RAD001. See Tai et al., Pharm Res. 2014, 31(3):706-719, the relevant disclosures of which are incorporated by reference for the purpose and subject matter referenced herein. Further, an exemplary rapamycin prodrug is NSC606698 (e.g., N-dimethylglycinate-methanesulfonic acid salt of rapamycin).

The rapamycin compounds disclosed herein can be synthesized using routine methods. See, e.g., WO 2019/064182 A, the relevant disclosures of which are incorporated by reference for the purpose and subject matter referenced herein.

The rapamycin compounds described herein, where applicable, can comprise one or more asymmetric centers, and thus can exist in various isomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., *Enantiomers, Racemates and Resolutions* (Wiley Interscience, New York, 1981); Wilen et al., *Tetrahedron* 33:2725 (1977); Eliel, *Stereochemistry of Carbon Compounds* (McGraw-Hill, N Y, 1962); and Wilen, *Tables of Resolving Agents and Optical Resolutions* p. 268 (E. L. Eliel, Ed., Univ. of Notre Dame Press, Notre Dame, Ind. 1972). The disclosure additionally encompasses compounds described herein as individual isomers substantially free of other isomers, and alternatively, as mixtures of various isomers.

In some examples, the rapamycin compound used in the methods disclosed herein may be an (R)-isomer. Alternatively, the CTX compound may be an (S)-isomer. In some examples, the rapamycin compound may be a mixture of (R) and (S) isomers.

Any of the rapamycin compounds disclosed herein may be conjugated with a biocompatible polymer, for example, polyethylene glycol (PEG) or copolymer of PEG-poly(lactic acid). Examples include rapamycin-Glyn-Poly[bis(ε-Lys) Glut-PEG], in which n is an integer of 1-3, inclusive as disclosed in Tai et al., 2014; or oligo(Lactic Acid)8-Rapamycin Prodrug-Loaded Poly(Ethylene Glycol)-block-Poly (Lactic Acid) (e.g., in micelle form).

The chemical elements are identified in accordance with the Periodic Table of the Elements, CAS version, *Handbook of Chemistry and Physics*, 75th Ed., inside cover, and specific functional groups are generally defined as described therein. Additionally, general principles of organic chemistry, as well as specific functional moieties and reactivity, are described in Thomas Sorrell, *Organic Chemistry*, University Science Books, Sausalito, 1999; Smith and March, *March's Advanced Organic Chemistry*, 5th Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3rd Edition, Cambridge University Press, Cambridge, 1987.

ATP-Competitive mTOR Kinase Compounds

ATP-competitive mTOR Kinase compounds, as described herein, encompass compounds that compete with ATP in the catalytic site of mTOR, pharmaceutically acceptable salts or esters thereof, and analogues thereof, including prodrugs thereof. In some embodiments, the ATP-competitive mTOR Kinase compounds are ATP-competitive dual PI3K/mTOR inhibitors, a class of drugs that target PI3K and both mTOR complexes. In some examples, ATP-competitive dual PI3K/mTOR inhibitors can be pyrimidine derivatives, for example, but not limited to, PI-103. In some examples, ATP-competitive dual PI3K/mTOR inhibitors can be imidazoquinoline derivatives, for example NVP-BEZ235. In some examples, ATP-competitive dual PI3K/mTOR inhibitors can be quinoxaline derivatives, for example XL765/SAR254409. Exemplary ATP-competitive dual PI3K/mTOR inhibitors include, but are not limited to, PI-103, NVP-BEZ235, NVP-BBD130, NVP-BGT226, SF-1126, XL765/SAR254409, GDC-0980, GDC-0084, GNE-493, GNE-477, GSK1059615, GSK2126458, PQR309, VS-5584, SB-2312, PKI-402, PKI-587/PF-05212384, WJD008, and PF-04691502. In some embodiments, the ATP-competitive mTOR Kinase compounds are mTOR kinase inhibitors (TORKIs), a class of ATP-competitive molecules which block only the mTOR catalytic domain. In some examples, TORKIs can be pyrimidine derivatives, for example, but not limited to, PP242. In some examples, TORKIs can be morpholino-linked pyrimidine derivatives, for example, but not limited to, WAY600. In some examples, TORKIs can be triazine derivatives, for example, but not limited to, OSI-027. Exemplary TORKIs include, but are not limited to, PP242, PP-30, Torin 1, Torin 2, Ku-0063794, AZD8055, AZD2014, CZ415, INK128/MNL0128 (also referred to as TAK-228), OSI-027, WYE-125132, WYE354, WYE312, WYE687, WAY600, Palomid 529, GDC-0349, CC223, and XL388.

In some embodiments, mTOR inhibitors, as described herein, encompass a bivalent inhibitor generated by combining a rapamycin compound with an ATP-competitive mTOR kinase compound. In some examples, a bivalent mTOR inhibitor combines rapamycin with TORKI. For example, a bivalent mTOR inhibitor can be rapamycin combined with INK128/MNL0128 or rapamycin combined with AZD8055. Exemplary bivalent mTOR inhibitors include, but are not limited to, RapaLink-1 and RapaLink-2.

II. Pharmaceutical Compositions

Any of the mTOR inhibitors disclosed herein (e.g., a rapamycin compound such as rapamycin) may be formulated to form a pharmaceutical composition, which further comprises a pharmaceutically acceptable carrier, diluent or excipient. Any of the pharmaceutical compositions to be used in the present methods can comprise pharmaceutically acceptable carriers, excipients, or stabilizers in the form of lyophilized formations or aqueous solutions.

The carrier in the pharmaceutical composition must be "acceptable" in the sense that it is compatible with the active ingredient of the composition, and preferably, capable of stabilizing the active ingredient and not deleterious to the subject to be treated. For example, "pharmaceutically acceptable" may refer to molecular entities and other ingredients of compositions comprising such that are physiologically tolerable and do not typically produce untoward reactions when administered to a mammal (e.g., a human). In some examples, the "pharmaceutically acceptable" carrier used in the pharmaceutical compositions disclosed herein may be those approved by a regulatory agency of the Federal or a state government or listed in the U.S. Pharmacopeia or other generally recognized pharmacopeia for use in mammals, and more particularly in humans.

Pharmaceutically acceptable carriers, including buffers, are well known in the art, and may comprise phosphate, citrate, and other organic acids; antioxidants including ascorbic acid and methionine; preservatives; low molecular weight polypeptides; proteins, such as serum albumin, gelatin, or immunoglobulins; amino acids; hydrophobic polymers; monosaccharides; disaccharides; and other carbohydrates; metal complexes; and/or non-ionic surfactants. See, e.g. Remington: The Science and Practice of Pharmacy 20th Ed. (2000) Lippincott Williams and Wilkins, Ed. K. E. Hoover.

In some embodiments, the pharmaceutical compositions or formulations are for parenteral administration, such as intravenous, intra-arterial, intra-muscular, subcutaneous, or intraperitoneal administration. In some embodiments, compositions comprising a mTOR inhibitors compound can be formulated for intravenous infusion.

Formulations suitable for parenteral administration include aqueous and non-aqueous sterile injection solutions which may contain anti-oxidants, buffers, bacteriostats and solutes which render the formulation isotonic with the blood of the intended recipient; and aqueous and non-aqueous sterile suspensions which may include suspending agents and thickening agents. Aqueous solutions may be suitably buffered (preferably to a pH of from 3 to 9). The preparation of suitable parenteral formulations under sterile conditions is readily accomplished by standard pharmaceutical techniques well-known to those skilled in the art.

In some embodiments, the pharmaceutical composition or formulation is suitable for oral, buccal or sublingual administration, such as in the form of tablets, capsules, ovules, elixirs, solutions or suspensions, which may contain flavoring or coloring agents, for immediate-, delayed- or controlled-release applications.

Suitable tablets may contain excipients such as microcrystalline cellulose, lactose, sodium citrate, calcium carbonate, dibasic calcium phosphate and glycine, disintegrants such as starch (preferably corn, potato or tapioca starch), sodium starch glycolate, croscarmellose sodium and certain complex silicates, and granulation binders such as polyvinylpyrrolidone, hydroxypropylmethylcellulose (HPMC), hydroxy-propylcellulose (HPC), sucrose, gelatin and acacia. Additionally, lubricating agents such as magnesium stearate, stearic acid, glyceryl behenate and talc may be included.

Solid compositions of a similar type may also be employed as fillers in gelatin capsules. Preferred excipients in this regard include lactose, starch, a cellulose, milk sugar or high molecular weight polyethylene glycols. For aqueous suspensions and/or elixirs, the compounds of the invention may be combined with various sweetening or flavouring agents, coloring matter or dyes, with emulsifying and/or suspending agents and with diluents such as water, ethanol, propylene glycol and glycerin, and combinations thereof.

In some embodiments, the pharmaceutical composition or formulation is suitable for intranasal administration or inhalation, such as delivered in the form of a dry powder inhaler or an aerosol spray presentation from a pressurized container, pump, spray or nebulizer with the use of a suitable propellant, e.g., dichlorodifluoromethane, trichlorofluoromethane, dichlorotetrafluoro-ethane, a hydrofluoroalkane, carbon dioxide or other suitable gas. In the case of a pressurized aerosol, the dosage unit may be determined by providing a valve to deliver a metered amount. The pressurized container, pump, spray or nebulizer may contain a solution or suspension of the active compound, e.g. using a mixture of ethanol and the propellant as the solvent, which may additionally contain a lubricant. Capsules and cartridges (made, for example, from gelatin) for use in an inhaler or insufflator may be formulated to contain a powder mix of the inhibitor and a suitable powder base such as lactose or starch.

The formulations may be presented in unit-dose or multi-dose containers, for example sealed ampoules or vials, and may be stored in a freeze-dried (lyophilized) condition requiring only the addition of the sterile liquid carrier immediately prior to use.

Any of the pharmaceutical composition disclosed herein may be in unit dosage forms such as tablets, pills, capsules, powders, granules, solutions or suspensions, or suppositories, for oral, parenteral or rectal administration, or administration by inhalation or insufflation, or intrathecal or intracerebral routes. "Dosage form" or "unit dosage form" refers to pharmaceutical drug product in the form, in which they are marketed for use. The unit dosage form of a mTOR inhibitor-containing pharmaceutical composition may comprise the amount of the mTOR inhibitor (e.g., a rapamycin compound such as rapamycin) to be administered to a patient in a single dose. For example, a unit dosage form of a rapamycin-containing composition may contain about 0.5 mg to about 2 mg rapamycin (e.g., about 0.75 mg, about 1.0 mg, about 1.25 mg, about 1.5 mg, or about 1.75 mg rapamycin).

III. Treatment of SKS with Low Dose of mTOR Inhibitors

Any of the mTOR inhibitors, for example, rapamycin compounds (e.g., rapamycin), can be used for alleviating and/or treating SKS at a low dose. Thus, in some aspects, the present disclosure provides methods for alleviating one or more symptoms and/or for treating SKS in a subject in need of the treatment a mTOR inhibitor compound described herein, a pharmaceutically acceptable salt or ester thereof, or a prodrug thereof, as well as a pharmaceutical composition comprising such. To perform the method disclosed herein, an effective amount of the mTOR inhibitor, the pharmaceutically acceptable salt or ester thereof, the prodrug thereof, or a pharmaceutical composition comprising any of such may be administered to a subject who needs treatment via a suitable route (e.g., intravenous infusion or oral administration) at a suitable amount as disclosed herein.

As used herein, the term "treating" refers to the application or administration of a composition including one or more active agents to a subject, who is in need of the treatment, for example, having a target disease or disorder, a symptom of the disease/disorder, or a predisposition toward the disease/disorder, with the purpose to cure, heal, alleviate, relieve, alter, remedy, ameliorate, improve, or affect the disorder, the symptom of the disease, or the predisposition toward the disease or disorder.

Alleviating a target disease/disorder includes delaying the development or progression of the disease, or reducing disease severity. Alleviating the disease does not necessarily require curative results. As used therein, "delaying" the development of a target disease or disorder means to defer, hinder, slow, retard, stabilize, and/or postpone progression of the disease. This delay can be of varying lengths of time, depending on the history of the disease and/or individuals being treated. A method that "delays" or alleviates the development of a disease, or delays the onset of the disease, is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detectable and assessed using standard clinical techniques as well known in the art. However, development also refers to progression that may be undetectable. For purpose of this disclosure, development or progression refers to the biological course of the symptoms. "Development" includes occurrence, recurrence, and onset. As used herein "onset" or "occurrence" of a target disease or disorder includes initial onset and/or recurrence.

A subject to be treated by any of the methods disclosed herein may be a human patient having SKS, who can be identified by routine medical examination, e.g., laboratory tests, organ functional tests, behavioral tests, CT scans, electroencephalogram, and/or magnetic resonance imaging (MRI). In some embodiments, the subject may be a human child SKS patient. Such a child patient may be younger than 16 years. In some examples, a child patient may have an age younger than 12, for example, younger than 10, 8, 6, 4 or 2. In some examples, the child patient is an infant, e.g., younger than 12 months, for example equal to or younger than 6 months. Alternatively, the subject may be a human adolescent patient (e.g., 16-20 years old) or a human adult patient having SKS.

SKS patients typically have one or more genetic mutations in the mTOR gene (homogenous or heterozygous), leading to hyperactivity of the mTOR pathway. The SKS patient to be treated in the method disclosed herein may carry such a mTOR mutation. In some examples, the SKS patient may carry at least one mutation in the FRAP-ATM-TTRAP (FAT) domain of the mTOR protein. In some examples, the SKS patient may carry at least one mutation in the kinase domain of the mTOR protein. In some examples, the SKS patient may carry at least one mutation in the FKBP12-rapamycin-binding (FRB) domain of the mTOR protein. In some examples, the SKS patient may carry at least one mutation in the C-terminal FAT (FATC) domains of the mTOR protein. In other examples, the SKS patient may carry a combination of any of the just-noted mutations. In some instances, the SKS patient may have a heterozygous mTOR mutation. Alternatively, the SKS patient may have a homogenous mTOR mutation.

In some examples, the SKS patient subject to the treatment disclosed herein may have at least a mutation in the mTOR gene, resulting in the following mTOR variants: p.Glu1799Lys, p.Lys1395Arg, p.Arg1480 Cys1483del, p.Arg1482Cys, p.Arg1482Pro, p.Cys1483Phe, p.Cys1483Tyr, p.Trp1490Arg, p.Ala1519Thr, p.Met1595Ile, p.Ala1832Thr, p.Phe1888Cys, p.Phe1888Ser, p.Ala1971Thr, p.Thr1977Ile, p.Arg2110Gln, p.Phe2202Cys, p.Met2327Ile, p.Gly2359Glu, p.Val2406Met, p.Gly2464Val, and p.Ile2501Val. Such a SKS patient may be younger than 16.

In one specific example, the SKS patient may have the mutation of c.4439_4450del (12 bp in-frame deletion) in the mTOR gene, leading to the p.Arg1480-1483del at the protein level. In another specific example, the SKS patient may have the c.5930C>T mutation in the mTOR gene, leading to the p.Thr1977Ile mutation at the protein level. In yet another example, the SKS patient may have the c.4184A>G mutation in the mTOR gene, leading to the p.Lys1395Arg mutation at the protein level. In another specific example, the SKS patient may have the c.6981G>A mutation in the mTOR gene, leading to the p.Met2327Ile mutation at the protein level. In still another example, the SKS patient may have the c.7216G>A mutation in the mTOR gene, leading to the p.Val2406Met mutation at the protein level. In another example, the SKS patient may have the c.4448G>A mutation in the mTOR gene, leading to the p.Cys1483Tyr mutation at the protein level. In another example, the SKS patient may have the c.7216G>A mutation in the mTOR gene, leading to the p.Val2406Met mutation at the protein level. Further, the SKS patient may have any additional mTOR mutations listed in Table 1.

Genetic testing can be performed to a candidate subject using routine generation sequencing methods, including, but not limited to, next-generation sequencing, pyrosequencing, Sanger sequencing, whole exome sequencing, whole genome sequencing, and the like.

In any of the methods disclosed herein, an effective amount of the mTOR inhibitor can be given to a SKS patient to alleviate one or more symptoms associated with SKS and, at the same time, to minimize the risk of causing negative impact on sleep patterns, locomotor activities, or other behavior features of the patient. "An effective amount" as used herein refers to a dose of a mTOR inhibitor, which is sufficient to confer a therapeutic effect on a subject having SKS and minimize the risk of inducing negative consequences on one or more of the behavior features such as sleep problems in the subject. In some instances, the sleep problems may comprise advanced sleep phase syndrome (ASPS), delayed sleep phase syndrome (DSPS), or a combination thereof.

Effective amounts vary, as recognized by those skilled in the art, depending on route of administration, excipient usage, and co-usage with other active agents. For example, an "effective amount" of a mTOR inhibitor, such as rapamycin, is the amount of the compound that alone, or together with further doses, produces the desired response, e.g., alleviating one or more symptoms associated with SKS (e.g., increased vocabulary, improved speech, decreased seizure frequency, or a combination thereof), while having little or no impact on behavior features such as locomotor activity, sleep patterns, hyperphagia, agitation, and/or sensitivity to pain. Such responses can be monitored by routine methods or can be monitored according to diagnostic methods of the present disclosures. The desired responses to treatment of the target disease also include delaying the onset or progress of SKS. Exemplary desired responses include improvement in motor skills, vision improvement, enhanced immune system, improved language development, decreased autistic behaviors, improved response to seizure medications, better seizure control, and/or decreased self-aggression.

Such amounts will depend, of course, on the particular condition being treated, the severity of the condition, the individual patient parameters including age, physical condition, size, gender and weight, the duration of the treatment, the nature of concurrent therapy (if any), the specific route of administration and like factors within the knowledge and expertise of the health practitioner. Effective amounts can also vary, depending on phenotypic variability among subjects having SKS, and/or the genetic mTOR mutations involved.

The effective amount of the mTOR inhibitor used in the method disclosed herein typically would be lower than the normal dose of the same mTOR inhibitor for other therapeutic applications. For example, an effective amount of rapamycin for use in the method disclosed herein may be an amount that result in an about 1 to about 3 ng/ml blood level of rapamycin in the SKS patient. In some examples, the effective amount of rapamycin can be an amount that result in an about 2 ng/ml blood level of rapamycin in the SKS patient. Such an amount can be determined by those skilled in the art following routine practice, for example, examining blood levels of rapamycin at multiple time points after rapamycin administration to determine whether the drug dose is proper.

In some instances, an initial dose of a mTOR may be given to a subject for a first course of treatment (e.g., about a week to about a month), which may be followed by one or more maintenance doses. The maintenance doses may be lower than the initial dose in the first course of treatment. Alternatively or in addition, the interval between two consecutive maintenance doses may be longer than the interview between two initial doses in the first course of treatment.

In some embodiments, about 0.125 to about 4 mg rapamycin may be given to a SKS patient once every day to once every three days. For example, about 0.5 mg to about 2 mg (e.g., about 0.5 mg, about 0.75 mg, about 1 mg, or about 1.5 mg) of rapamycin may be administered to a SKS patient once every day to once every three days. In other examples, about 0.125 mg to about 0.625 mg rapamycin may be administered to a SKS patient once every day to once every three days.

In some examples, a SKS patient can be given about 0.5 mg to about 1.5 mg rapamycin (e.g., about 0.5 mg, 0.75 mg, about 1 mg, about 1.25 mg, or about 1.5 mg) on a daily basis. In some examples, a SKS patient can be given a daily dose of about 1 mg of rapamycin orally. In some examples, a SKS patient can be given a daily dose of about 1.5 mg to about 1.75 of rapamycin orally. In other examples, a SKS patient can be given a dose of about 1 mg of rapamycin orally once every other day. In yet another example, a SKS patient may be given a daily dose of about 2 mg rapamycin and a daily dose of about 4 mg rapamycin alternatively via oral administration. See also Table 4 below.

Conventional methods, known to those of ordinary skill in the art of medicine, can be used to administer the mTOR-containing pharmaceutical composition to the SKS subject. For example, this pharmaceutical composition can also be administered via, e.g., administered orally, parenterally, by inhalation spray, topically, rectally, nasally, buccally, vaginally or via an implanted reservoir. The term "parenteral" as used herein includes subcutaneous, intracutaneous, intravenous, intramuscular, intraarticular, intraarterial, intrasynovial, intrasternal, intrathecal, intralesional, and intracranial injection or infusion techniques. In addition, it can be administered to the subject via injectable depot routes of administration such as using 1-week, half (or two week)-, 1-, 3-, or 6-month depot injectable or biodegradable materials and methods.

Injectable compositions may contain various carriers such as vegetable oils, dimethylactamide, dimethyformamide, ethyl lactate, ethyl carbonate, isopropyl myristate, ethanol, and polyols (glycerol, propylene glycol, liquid polyethylene glycol, and the like). For intravenous injection, water-soluble antibodies can be administered by the drip method, whereby a pharmaceutical formulation containing the compounds of Formula (I) and a physiologically acceptable excipient is infused. Physiologically acceptable excipients may include, for example, 5% dextrose, 0.9% saline, Ringer's solution or other suitable excipients. Intramuscular preparations, e.g., a sterile formulation of a suitable soluble salt form of the compounds of Formula (I), can be dissolved and administered in a pharmaceutical excipient such as Water-for-Injection, 0.9% saline, or 5% glucose solution.

For oral administration, the pharmaceutical composition can take the form of, for example, tablets or capsules, prepared by conventional means with acceptable excipients such as binding agents (for example, pre-gelatinised maize starch, polyvinylpyrrolidone or hydroxypropyl methylcellulose); fillers (for example, lactose, microcrystalline cellulose or calcium hydrogen phosphate); lubricants (for example, magnesium stearate, talc or silica); disintegrants (for example, potato starch or sodium starch glycolate); or wetting agents (for example, sodium lauryl sulphate). The tablets can be coated by methods well known in the art. Also included are bars and other chewable formulations.

In some embodiments, the subject to be treated by the method described herein may be a human patient who has undergone or is subjecting to an anti-SKS therapy. The prior anti-SKS therapy may be complete. Alternatively, the anti-SKS therapy may be still ongoing. In other embodiments, the SKS patient may be subject to a combined therapy involving the mTOR inhibitor therapy disclosed herein and a second anti-SKS therapy. Exemplary anti-SKS treatments include, but are not limited to, treatment of behavioral abnormalities, seizures, speech therapy, physical therapy, and so forth. Additional useful agents and therapies can be found in Physician's Desk Reference, 59.sup.th edition, (2005), Thomson P D R, Montvale N.J.; Gennaro et al., Eds. Remington's The Science and Practice of Pharmacy 20.sup.th edition, (2000), Lippincott Williams and Wilkins, Baltimore Md.; Braunwald et al., Eds. Harrison's Principles of Internal Medicine, 15.sup.th edition, (2001), McGraw Hill, N.Y.; Berkow et al., Eds. The Merck Manual of Diagnosis and Therapy, (1992), Merck Research Laboratories, Rahway N.J.

In some embodiments, the dosage of a mTOR inhibitor such as a rapamycin compound (e.g., rapamycin) may be adjusted based on the SKS patient's response to the treatment. For example, if the SKS patient shows worsening of one or more behavior features (e.g., sleep patterns and/or locomotor activities), the dose of the mTOR inhibitor can be reduced. Alternatively, if the SKS patient does not show clear improvement of SKS symptoms, the dose of the mTOR inhibitor may be increased. See descriptions below for using behavior features as biomarkers for assessing suitable doses and/or treatment efficacy of a mTOR inhibitor in individual SKS patients.

IV. Use of Behavior Feature Biomarkers for Determination of Personalized Doses of mTOR Inhibitor for Individual SKS Patients and for Assessment of Treatment Efficacy Also disclosed herein are the use of one or more behavior features as biomarkers for assessing and determining suitable doses of mTOR inhibitors for alleviating SKS symptoms in individual SKS patients. Such behavior biomarkers can also be used for assessing treatment efficacy. Accordingly, provided herein is a method for alleviating Smith Kingsmore Syndrome (SKS) in a subject, the method comprising: (i) administering to a subject in need thereof an initial dose of a mTOR inhibitor (those disclosed herein such as rapamycin compounds, e.g., rapamycin); (ii) monitoring one or more behavior features of the subject before and after administration of the rapamycin compound; and (iii) adjusting the dose of the mTOR inhibitor based on the result of (ii).

The term "biomarker" as used herein refers to an indicator that provides information about optimal dosing of a mTOR inhibitor (e.g., a rapamycin compound such as rapamycin) to achieve an outcome of interest (e.g., alleviate at least one symptom associated with SKS), without also having a negative impact on behavior features such as a sleep pattern in the subject.

In some embodiments, sleep patterns can be used as a biomarker for assessing and determining suitable doses of mTOR inhibitors for use in the method disclosed herein. Sleep patterns can include advanced sleep phase syndrome (ASPS), delayed sleep phase syndrome (DSPS), or a combination thereof. ASPS is characterized by persistent advanced sleep onsets and awakenings that are earlier than desired. DSPS is a disorder in which a person's sleep is delayed by two hours or more beyond what is considered an acceptable or conventional bedtime. Sleep patterns can be monitored by routine methods known in the art, including but not limited to, actigraphy, polysomnography (PSG), electroencephalography (EEG), electrooculargraphy, and electromyography (EMG). In some examples, sleep patterns are monitored using actigraphy.

After administration of an initial dose of mTOR inhibitor (e.g., a rapamycin compound such as rapamycin), the sleep pattern of the SKS patient may be monitored following routine practice or the methods provided herein. If the SKS patient develops a sleep problem or has a sleep problem worsened, the dose of the mTOR can be reduced. Alternatively, if the initial dose of the mTOR inhibitor does not show impact on the sleep pattern of the SKS patient, the dose of the mTOR inhibitor may be maintained or increased.

In some embodiments, locomotor activities can be used as a biomarker assessing and determining suitable doses of mTOR inhibitors for use in the method disclosed herein, or for assessing treatment efficacy. In some examples, stereotypic behavior can be monitored as a representation of locomotor activity. Stereotypic behavior refers to a repetitive or ritualistic movement, posture, or utterance. Stereotypies may be simple movements such as body rocking, or complex, such as self-caressing, crossing and uncrossing of legs, and marching in place.

After administration of an initial dose of mTOR inhibitor (e.g., a rapamycin compound such as rapamycin), the stereotypic behavior of the SKS patient may be monitored following routine practice or the methods provided herein. If the SKS patient develops a stereotypic behavior problem or has a stereotypic behavior enhanced, the dose of the mTOR can be reduced. Alternatively, if the initial dose of the mTOR inhibitor does not show impact on the stereotypic behavior or decreases stereotypic behavior in the SKS patient, this indicates that the mTOR inhibitor at the initial dose is effective. The dose of the mTOR inhibitor may be maintained or increased.

In other embodiments, hyperphagia can be used as a biomarker for assessing and determining suitable doses of mTOR inhibitors for use in the method disclosed herein, or for assessing treatment efficacy. Hyperphagia refers to an abnormally strong sensation of hunger or desire to eat, often leading to or accompanied by overeating. After administration of an initial dose of mTOR inhibitor (e.g., a rapamycin compound such as rapamycin), development and/or progression of hyperphagia in the SKS patient may be monitored following routine practice or the methods provided herein. If the SKS patient develops hyperphagia or has a progression of hyperphagia, the dose of the mTOR can be reduced. Alternatively, if the initial dose of the mTOR inhibitor does not lead to development of hyperphagia or alleviates hyperphagia in the SKS patient, this indicates that the mTOR inhibitor at the initial dose is effective. The dose of the mTOR inhibitor may be maintained or increased.

In other embodiments, agitation or sensation of pain can be used as a biomarker assessing and determining suitable doses of mTOR inhibitors for use in the method disclosed herein, or for assessing treatment efficacy. Agitation refers to a state of anxiety or nervous excitement. After administration of an initial dose of mTOR inhibitor (e.g., a rapamycin compound such as rapamycin), development and/or progression of agitation and/or sensation of pain in the SKS patient may be monitored following routine practice or the methods provided herein. If the SKS patient develops agitation, has a progression of agitation, or has an enhanced sensation of pain, the dose of the mTOR can be reduced. Alternatively, if the initial dose of the mTOR inhibitor does not lead to development of agitation or has no impact on sensation of pain, or alleviates/reduces agitation/pain in the SKS patient, this indicates that the mTOR inhibitor at the initial dose is effective. The dose of the mTOR inhibitor may be maintained or increased.

Alternatively or in addition, seizure control can be used as a biomarker for assessing and determining suitable doses of mTOR inhibitors for use in the method disclosed herein, or for assessing treatment efficacy. A seizure is a sudden, uncontrolled electrical disturbance in the brain. It can cause changes in a subject's behavior, movements or feelings, and in levels of consciousness. After administration of an initial dose of mTOR inhibitor (e.g., a rapamycin compound such as rapamycin), development and/or frequency changes in the SKS patient may be monitored following routine practice or the methods provided herein. If the SKS patient develops seizure or has an increased frequency of seizure, the dose of the mTOR can be reduced. Alternatively, if the initial dose of the mTOR inhibitor does not lead to development of seizure, or results in a reduced frequency of seizure, this indicates that the mTOR inhibitor at the initial dose is effective. The dose of the mTOR inhibitor may be maintained or increased.

Using one or more of the behavior feature biomarkers disclosed herein, a suitable dose of a mTOR inhibitor such as a rapamycin compound (e.g., rapamycin) may be determined for an individual SKS patient. The one or more of the behavior feature biomarkers disclosed herein can also be used to assess therapeutic efficacy of the low dose mTOR inhibitor-involving treatment disclosed herein.

V. Kits for Use in SKS Treatment

The present disclosure also provides kits for use in treating SKS as described herein. A kit for therapeutic use as described herein may include one or more containers comprising a mTOR inhibitor, such as a rapamycin compound (e.g., rapamycin). The mTOR inhibitor may be formulated in a pharmaceutical composition.

In some embodiments, the kit can additionally comprise instructions for use of a mTOR inhibitor in any of the methods described herein. The included instructions may comprise a description of administration of the mTOR inhibitor (e.g., a rapamycin compound such as rapamycin) or a pharmaceutical composition comprising such to a subject to achieve the intended activity in a subject. The kit may further comprise a description of selecting a subject suitable for treatment based on identifying whether the subject is in need of the treatment. In some embodiments, the instructions comprise a description of administering the rapamycin compound or the pharmaceutical composition comprising such to a subject who has or is suspected of having SKS.

The instructions relating to the use of the rapamycin compound or the pharmaceutical composition comprising such as described herein generally include information as to dosage, dosing schedule, and route of administration for the intended treatment. In some embodiments, the instructions comprise a description of optimizing the dose of rapamycin in a subject having SKS using one or more of the behavior features (e.g., sleep patterns) as a biomarker. The containers may be unit doses, bulk packages (e.g., multi-dose packages) or sub-unit doses. Instructions supplied in the kits of the disclosure are typically written instructions on a label or package insert. The label or package insert indicates that the pharmaceutical compositions are used for treating, delaying the onset, and/or alleviating a disease or disorder in a subject.

The kits provided herein are in suitable packaging. Suitable packaging includes, but is not limited to, vials, bottles, jars, flexible packaging, and the like. Also contemplated are packages for use in combination with a specific device, such as an inhaler, nasal administration device, or an infusion device. A kit may have a sterile access port (for example, the container may be an intravenous solution bag or a vial having a stopper pierceable by a hypodermic injection needle). The container may also have a sterile access port.

Kits optionally may provide additional components such as buffers and interpretive information. Normally, the kit comprises a container and a label or package insert(s) on or associated with the container. In some embodiment, the disclosure provides articles of manufacture comprising contents of the kits described above.

General Techniques

The practice of the present disclosure will employ, unless otherwise indicated, conventional techniques of molecular biology (including recombinant techniques), microbiology, cell biology, biochemistry, and immunology, which are within the skill of the art. Such techniques are explained fully in the literature, such as *Molecular Cloning: A Laboratory Manual*, second edition (Sambrook, et al., 1989) Cold Spring Harbor Press; *Oligonucleotide Synthesis* (M. J. Gait, ed. 1984); *Methods in Molecular Biology*, Humana Press; *Cell Biology: A Laboratory Notebook* (J. E. Cellis, ed., 1989) Academic Press; Animal Cell Culture (R. I. Freshney, ed. 1987); Introduction to Cell and Tissue Culture (J. P. Mather and P. E. Roberts, 1998) Plenum Press; Cell and Tissue Culture: Laboratory Procedures (A. Doyle, J. B. Griffiths, and D. G. Newell, eds. 1993-8) J. Wiley and Sons; Methods in Enzymology (Academic Press, Inc.); Handbook of Experimental Immunology (D. M. Weir and C. C. Blackwell, eds.): Gene Transfer Vectors for Mammalian Cells (J. M. Miller and M. P. Calos, eds., 1987); Current Protocols in Molecular Biology (F. M. Ausubel, et al. eds. 1987); PCR: The Polymerase Chain Reaction, (Mullis, et al., eds. 1994); Current Protocols in Immunology (J. E. Coligan et al., eds., 1991); Short Protocols in Molecular Biology (Wiley and Sons, 1999); Immunobiology (C. A. Janeway and P. Travers, 1997); Antibodies (P. Finch, 1997); Antibodies: a practice approach (D. Catty., ed., IRL Press, 1988-1989); Monoclonal antibodies: a practical approach (P. Shepherd and C. Dean, eds., Oxford University Press, 2000); Using antibodies: a laboratory manual (E. Harlow and D. Lane (Cold Spring Harbor Laboratory Press, 1999); The Antibodies (M. Zanetti and J. D. Capra, eds. Harwood Academic Publishers, 1995); *DNA Cloning: A practical Approach*, Volumes I and II (D. N. Glover ed. 1985); Nucleic Acid Hybridization (B. D. Hames & S. J. Higgins eds. (1985»; *Transcription and Translation* (B. D. Hames & S. J. Higgins, eds. (1984»; *Animal Cell Culture* (R. I. Freshney, ed. (1986»; *Immobilized Cells and Enzymes* (1RL Press, (1986»; and B. Perbal, *A practical Guide To Molecular Cloning* (1984); F. M. Ausubel et al. (eds.).

Without further elaboration, it is believed that one skilled in the art can, based on the above description, utilize the present invention to its fullest extent. The following specific embodiments are, therefore, to be construed as merely illustrative, and not limitative of the remainder of the disclosure in any way whatsoever. All publications cited herein are incorporated by reference for the purposes or subject matter referenced herein.

EXAMPLES

While the present disclosure has been described with reference to the specific embodiments thereof, it should be understood by those skilled in the art that various changes may be made and equivalents may be substituted without departing from the true spirit and scope of the disclosure. In addition, many modifications may be made to adapt a particular situation, material, composition of matter, process, process step or steps, to the objective, spirit, and scope of the present disclosure. All such modifications are intended to be within the scope of the disclosure.

Example 1. Treatment of Smith-Kingsmore Syndrome with Low Doses of Rapamycin (Sirolimus)

Smith-Kingsmore Syndrome (SKS) is a genetic disorder involving mutations in the mammalian target of rapamycin (mTOR) gene that increase the activity of the mTOR protein and, consequently, mTOR signaling. Among other issues, overactive mTOR signaling in brain cells disrupts brain growth and development and synaptic plasticity, leading to the primary complications of SKS—self-aggression, intellectual and behavior issues.

This study aims at investigating therapeutic effects of low doses of rapamycin (sirolimus) on alleviating one or more symptoms of SKS patients, while minimizing negative impact on behavior features of the patients (e.g., sleep).

Seven subjects (referred to as patients 1-7 in this example) were identified as having an increase-of-function mutation in the mTOR gene and were selected to receive sirolimus (rapamycin) at low doses. The mTOR gene mutation information for each patient is provided in Table 1 and the patient data is provided in Table 2 below.

TABLE 1

Patient mTOR gene mutations

| Patient | mTOR variant observed | Location of mutation | Mode of inheritance | Method of mutation detection |
|---|---|---|---|---|
| 1 | c.4439_4450del (12 bp in-frame deletion) New variant p.Arg1480-1483del | FAT domain | de novo | exome sequencing |
| 2 | c.5930C>T Reported mosaic (positive skin) p.Thr1977Ile | FAT domain | mosaic - 32% skin | exome sequencing - tissue |
| 3 | c..4184A>G novel variant p.Lys1395Arg | FAT domain | de novo | exome sequencing |
| 4 | c.6981G>A reported variant p.Met2327Ile | Kinase Domain | de novo | exome sequencing |
| 5 | c.7216G>A Novel variant p.Val2406Met | Kinase Domain | de novo | exome sequencing |
| 6 | c.4448G>A Mosaic 30% p.Cys1483Tyr | FAT domain | mosaic, de novo | exome sequencing |
| 7 | c.7216G>A known variant p.Val2406Met | Kinase Domain | de novo | exome sequencing |

TABLE 2

Patient Data

| Patient | Gender | Age | Height (cm) | Weight (kg) |
|---|---|---|---|---|
| 1 | M | 16 yo | 172.1 (50th percentile) | 55 (25th percentile) |
| 2 | F | 4 yo | 108.8 | 19.6 (90th percentile) |
| 3 | M | 4.5 yo | N/A | 21.8 |
| 4 | F | 6 yo | N/A (97th percentile) | 22.7 |
| 5 | M | 4 yo | 107.4 | 12.6 |
| 6 | M | 22 mos | 92 | 15 |
| 7 | M | 20 yo | 164 (3rd percentile) | 78.1 (65th percentile) |

In addition to increase of function mutations in the mTOR gene, the patients demonstrated other clinical aspects correlated with SKS. The additional clinical information is provided in Table 3 below.

TABLE 3

Clinical Information

| Condition | Patient 1 | Patient 2 | Patient 3 | Patient 4 | Patient 5 | Patient 6 | Patient 7 |
|---|---|---|---|---|---|---|---|
| | | | | Presence in Patient | | | |
| Seizures | — | — | — | — | — | yes | yes |
| Seizure type | — | — | — | — | — | Refactory | localized and generalized epilepsy |
| EEG anomalies | — | — | — | — | — | yes | yes |
| Behavioral anomalies | yes | yes | — | — | — | — | — |
| Autism | yes | yes | yes | — | yes | — | yes |
| Hyperactivity | yes | yes | yes | — | — | — | yes |
| Sleep apnea | no | no | — | no | possibly | no | yes |
| Sleep problems | yes | Yes | Yes takes 1 ml of melatonin - snoring - he gets up | Yes snoring tonsils | yes snoring in the past | No concerns | Bedtime during the week is 2030 and 2030 over the |

TABLE 3-continued

Clinical Information

| Condition | Patient 1 | Patient 2 | Patient 3 | Patient 4 | Patient 5 | Patient 6 | Patient 7 |
|---|---|---|---|---|---|---|---|
| | | | few times a night | | | | weekend. Waking time is during the week is usually 0530 and 0700 over the weekend. |
| Chronotype (ASPS/DSPS) | DSPS | DSPS* | 8:30-6 am | 6:30 pm-4:30 am | 11 pm-8 am - 3 hour nap during day | — | — |
| Hyperphagia | yes | yes | — | yes | Food motivation but he does overeat, picky eater | Yes | — |

*Developed after sirolimus treatment.

Most patients (6 out of the 7 in this example) appear to have sleep difficulties (restless/fragmentation) prior to sirolimus treatment, suggesting that sleep is a biomarker for the mammalian target of rapamycin (mTOR) activity in the brain. For circadian rhythm in a healthy subject, a standard free-running period (or "tau") is about 24 hours. If a subject has too much mTOR activity in the brain, tau is shortened (e.g., from 24 to 22 hours), causing the subject to get up earlier and wake up earlier. Conversely, if a subject has too little mTOR activity in the brain, tau is lengthened causing the subject to sleep later and stay up later. In this example, the dosage of sirolimus was optimized for each patient based on the patient's sleep patterns after an initial dose regimen of sirolimus. Table 4 provides sirolimus dosing for each patient before and after observing patient sleep patterns.

TABLE 4

Sirolimus Dosing

| Patient | Initial Sirolimus Dose | Sirolimus blood level (ng/ml) | Sleep Pattern Observations after initial dosing regimen | Adjusted Sirolimus Dosing | Parent Reported Benefits/Outcomes |
|---|---|---|---|---|---|
| 1 | 1 mg daily | 1.6 (1) 4.1 (2), 4.5 (2), 5.1 (2), <1 (stop) | As dose was increased sleep became problematic and cyclic | Restart at 1 mg every Monday, Wednesday, and Friday | No self-injuries, less moaning, more attentive - parents noted he can grasp some ideas, regulates appetite. Consistent mood, decrease use of tylenol/iburpofen for pain/agitation, less stimming, sitting better, and few times single words. Able to sit in couch and watch t.v. or listening to music. He does this more now that he used to, which ties in to his more relaxed demeanor. Patient's weekly step count has dropped from the extreme step count of 317,140 steps the week to an average of 50,000 steps per week in the months since then. Parents attribute the significant drop in weekly steps to less stimming/fidgeting overall and more nightly sleep. |
| 2 | 1 mg daily - increase to 1.5-1.75 mg | 3.6 (1), 4.2 (1.5), 3.1 (1 25) | As dose was increased sleep became problematic and cyclic but improved with dose reduction | Dose reduced to 0.5 mg daily -- 0.25 mg -- 0.125 -- alternating 0.125 mg - 0.0625 mg/day | Better attention to TV, better eye contacts, looking at me when wanting something. A bit of playing with all toy with mom. She walked well and tried to sit down. |
| 3 | 2 ml-2 mg | 2.7-3.1- 2.6 | Some sleep disturbance, increased stimming, and dry skin. | 2 mg | Patient likes to jump and bounce and he seems to be more cognitively aware since being on the rapamycin. He tends to be happy and smiles a lot. Moves better, understands better. More words and working on counting. |

TABLE 4-continued

Sirolimus Dosing

| Patient | Initial Sirolimus Dose | Sirolimus blood level (ng/ml) | Sleep Pattern Observations after initial dosing regimen | Adjusted Sirolimus Dosing | Parent Reported Benefits/Outcomes |
|---|---|---|---|---|---|
| 4 | 2 ml-2 mg | N/A | 1 year treatment - no side effects per family | No change | Speech improved - talking clear, and behavior more attentive |
| 5 | 0.5 mg daily | N/A | N/A | No change | Pending visit for re-evaluation. |
| 6 | 0.5 mg -- reduced 0.25 mg -- then increased back for seizure control 0.5 mg/daily | 6.2 ng/mL-4 ng/ml - | N/A | No change | Reduced frequency of seizures and working on decreasing dose of multiple other antiepileptics. |
| 7 | 2 mg-4 mg (alternating) | N/A | Patient had at baseline sleep apnea and other related complications | No change | |

Table 4 shows that problems sleeping and delayed sleep phase syndrome (DSPS) with short sleep cycle developed after initial sirolimus dosing in 3 out of 7 patients. One of these patients (Patient 2) had rapid improvement of DSPS after dose reduction of rapamycin indicating sleep acts as a biomarker of mTOR inhibitor dosing for SKS.

In patient follow-up after rapamycin treatment, patients generally reported little to no self injuries, less moaning, more attentiveness, consistent mood, less agitation, less stimming, improved sitting, better eye contact, increased vocabulary, increased step count, less hyperphagia, less fidgeting, improved demeanor, increased understanding and awareness, and improved sleep patterns (Table 4). Additionally, one patient had improved of seizure control on a sirolimus regimen.

In sum, this clinical study indicates that low doses of mTOR inhibitors such as rapamycin would be effective in alleviating symptoms associated with SKS in SKS patients carrying various mTOR mutations that lead to over-reactivity of the mTOR signaling and minimizing negative impact on behavior features such as sleep. The results of this study also suggest that behavior features such as sleep and locomotor activity (e.g., stereotypic behavior, hyperphagia, agitation, sensitivity to pain, seizure control, or any combination thereof) can be used as biomarkers for monitoring and adjusting dosage of the mTOR inhibitor in a SKS patient.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

The term "about" or "approximately" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value. Alternatively, particularly with respect to biological systems or processes, the term can mean within an order of magnitude, preferably within 2-fold, of a value. Where particular values are described in the application and claims, unless otherwise stated, the term "about" is implicit and in this context means within an acceptable error range for the particular value.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method for alleviating Smith Kingsmore Syndrome (SKS) in a subject, the method comprising administering to a subject in need thereof an effective amount of a mTOR inhibitor, wherein the mTOR inhibitor is a rapamycin compound, and wherein the effective amount of the mTOR inhibitor is sufficient to alleviate at least one symptom associated with SKS and is substantially free of negative impact on sleep in the subject.

2. The method of claim 1, wherein the rapamycin compound is rapamycin and the effective amount of rapamycin results in a blood level of rapamycin at about 1-3 ng/ml in the subject.

3. The method of claim 2, wherein the subject is administered about 0.5 mg to 2 mg of the rapamycin once every 1 to 3 days.

4. The method of claim 3, wherein the subject is administered a daily dose of rapamycin at about 0.5 mg to 2 mg.

5. The method of claim 1, further comprising monitoring impact on the sleeping pattern of the subject after administration of the mTOR inhibitor, and adjusting dose of the mTOR inhibitor based on changes in sleeping pattern before and after administration of the rapamycin compound.

6. The method of claim 5, wherein the dose of the mTOR inhibitor is reduced when administration of the mTOR inhibitor worsens a sleep problem in the subject.

7. The method of claim 6, wherein the sleep problem comprises advanced sleep phase syndrome (ASPS), delayed sleep phase syndrome (DSPS), or a combination thereof.

8. The method of claim 2, wherein the subject is administered an initial dose of the rapamycin for a first course of treatment, the initial dose being about 0.5 mg per day, and wherein the subject is administered a maintenance dose of the rapamycin after the first course of treatment to maintain the blood level of the rapamycin compound at about 1-3 ng/ml in the subject.

9. The method of claim 8, wherein the initial dose of the rapamycin is increased when the blood level of rapamycin is lower than 1 ng/ml in the subject after administration of the rapamycin.

10. The method of claim 1, wherein the mTOR inhibitor is formulated in a pharmaceutical composition, which further comprises a pharmaceutically acceptable carrier.

11. The method of claim 1, wherein the mTOR inhibitor is administered to the subject by a parenteral route or orally.

12. The method of claim 1, wherein the subject is a human patient having SKS.

13. The method of claim 12, wherein the human patient is a human child.

14. A method for alleviating Smith Kingsmore Syndrome (SKS) in a subject, the method comprising:
   (i) administering to a subject in need thereof an initial dose of a mTOR inhibitor, wherein the mTOR inhibitor is a rapamycin compound;
   (ii) monitoring one or more behavior features of the subject before and after administration of the rapamycin compound; and (iii) adjusting the dose of the mTOR inhibitor based on the result of (ii).

15. The method of claim 14, wherein the one or more behavior features comprise locomotor activity, sleep pattern, hyperphagia, agitation, sensitivity to pain, seizure control, or a combination thereof.

16. The method of claim 15, wherein the one or more behavior features comprise a sleep pattern, which comprises advanced sleep phase syndrome (ASPS), delayed sleep phase syndrome (DSPS), or a combination thereof.

17. The method of claim 16, wherein step (iii) is performed by reducing the dose of the mTOR inhibitor when the initial dose of the mTOR inhibitor leads to negative impact on the sleep pattern.

18. The method of claim 16, wherein the one or more behavior features comprise locomotor activity, which comprises stereotypic behavior.

19. The method of claim 18, wherein step (iii) is performed by increasing the dose of the mTOR inhibitor when the initial dose of the mTOR inhibitor leads to reduced stereotypic behavior, or wherein step (iii) is performed by reducing the dose of the mTOR inhibitor when the initial dose of the mTOR inhibitor leads to increased stereotypic behavior.

20. The method of claim 14, wherein the rapamycin compound is rapamycin.

21. The method of claim 20, wherein the initial dose of the rapamycin ranges from about 0.5 mg to about 2 mg once a day to once every three days.

22. The method of claim 21, wherein the initial dose of the rapamycin is a daily dose of about 0.5-2 mg.

23. The method of claim 14, wherein the mTOR inhibitor is formulated in a pharmaceutical composition, which further comprises a pharmaceutically acceptable carrier.

24. The method of claim 14, wherein the mTOR inhibitor is administered to the subject by a parenteral route or orally.

25. The method of claim 14, wherein the subject is a human patient having SKS.

26. The method of claim 25, wherein the human patient is a human child.

* * * * *